(12) United States Patent
Baudart et al.

(10) Patent No.: US 8,220,857 B2
(45) Date of Patent: Jul. 17, 2012

(54) BEAM FOR A MOTOR VEHICLE DASHBOARD

(75) Inventors: Laurent Baudart, Fresnoy en Thelle (FR); Sergio Da Costa Pito, Cergy (FR)

(73) Assignee: Faurecia Interieur Industrie, Nanterre (FR)

( * ) Notice: Subject to any disclaimer, the term of this patent is extended or adjusted under 35 U.S.C. 154(b) by 113 days.

(21) Appl. No.: 12/747,643

(22) PCT Filed: Dec. 8, 2008

(86) PCT No.: PCT/FR2008/052241
§ 371 (c)(1),
(2), (4) Date: Jun. 11, 2010

(87) PCT Pub. No.: WO2009/080968
PCT Pub. Date: Jul. 2, 2009

(65) Prior Publication Data
US 2010/0259064 A1    Oct. 14, 2010

(30) Foreign Application Priority Data
Dec. 14, 2007   (FR) ...................... 07 59856

(51) Int. Cl.
*B62D 25/14* (2006.01)
(52) U.S. Cl. ......................... 296/72; 296/70; 296/193.02
(58) Field of Classification Search ............ 296/29, 296/70, 72, 187.12, 193.01, 193.02
See application file for complete search history.

(56) References Cited

U.S. PATENT DOCUMENTS

| | | | | |
|---|---|---|---|---|
| 6,325,440 B1 * | 12/2001 | Emmerich | ...................... | 296/70 |
| 6,382,695 B1 * | 5/2002 | Decome | ........................... | 296/70 |
| 6,523,878 B2 * | 2/2003 | Scheidel | ........................... | 296/70 |
| 7,128,360 B2 * | 10/2006 | Scheib et al. | .................... | 296/70 |
| 7,152,295 B2 * | 12/2006 | Goetz et al. | ...................... | 29/434 |
| 7,407,221 B2 * | 8/2008 | Kring et al. | ............. | 296/193.02 |
| 2005/0110302 A1 * | 5/2005 | Riha et al. | ................ | 296/193.02 |
| 2007/0194605 A1 | 8/2007 | Merkle et al. | | |

FOREIGN PATENT DOCUMENTS

| | | |
|---|---|---|
| WO | 03/031746 | 4/2003 |
| WO | 2005/090145 | 9/2005 |
| WO | 2007/135262 | 11/2007 |

OTHER PUBLICATIONS

International Search Report dated May 8, 2009, from corresponding PCT application.

* cited by examiner

*Primary Examiner* — Dennis Pedder
*Assistant Examiner* — Jason S Daniels
(74) *Attorney, Agent, or Firm* — Young & Thompson

(57) ABSTRACT

A tubular dashboard beam (100) has a circular cross-section and extends transversely between vertical pillars of a motor vehicle. The beam is formed in one piece and has at least two different diameters (d1, d2, d3) between the two ends thereof, a larger diameter (d1) of the beam being in the region of an end (101, 102) of the beam which is intended to be located in the region of a driver's seat of the motor vehicle. At least the end at the driver's seat side which must be fixed to a vertical pillar of the motor vehicle is partially crushed so as to have a cross-section in the form of a circular arc whose chord (105) which closes the cross-section extends at one side and the other of the circular arc (106), providing a planar face whose lateral edges (109) surround the curved face of the circular arc.

18 Claims, 2 Drawing Sheets

BEAM FOR A MOTOR VEHICLE DASHBOARD

The invention relates to a beam for a motor vehicle dashboard which is intended to extend between vertical pillars of the vehicle and in particular to support the steering column of the motor vehicle. More precisely, the invention relates to the ends for fitting such a beam to the vertical pillars of the motor vehicle.

Generally, as illustrated in FIG. 1 of the prior art which schematically illustrates a reinforcement structure 2 which is mounted at the rear of a dashboard (not illustrated) of a motor vehicle 1, the reinforcement structure 2 comprises a main beam 3 which supports the steering column 4 of the motor vehicle 1. The beam 3 is fixed by two opposing ends 5, 6 to vertical pillars which bound the right and left sides of the vehicle 1. More precisely, the ends 5, 6 of the beam 3 are fixedly joined to the vertical pillars of the motor vehicle 1 using lateral support elements 7, such as clamps.

FIG. 2 illustrates an example of a structural unit 13 according to the prior art which is provided with a main beam 3 which is formed by two tubes 8 and 9 which have different diameters and which are fixedly joined to each other, for example, by means of welding. The structural unit 13 also comprises a force leg 14 which is fixedly joined to the tube 9 having the larger diameter, and means 15 for retaining and positioning a steering column which are also fixedly joined to the tube 9 having the larger diameter.

Since there is most often little space available for the reinforcement structure in the cockpit of a motor vehicle, the spatial requirement of the beam must be minimised. Therefore, it is known, so that the main beam of the dashboard has sufficient strength and inertia to absorb the vibrations transmitted, in particular by the engine block, to increase the diameter and/or the thickness of the beam at the location of the beam portion 9 which is intended to be located in the region of the driver, so that the vibrations are not transmitted to the dashboard and to the steering column carried by this portion 9 of the beam 3. The remainder of the beam, which is subject to less stress, has a smaller diameter and thickness. In this manner, in the example illustrated in FIG. 2, the diameter of the tube 9 which forms the beam portion 3 at the driver side is 50 mm with a thickness of 2.5 mm, whilst the diameter of the tube 8 which forms the portion of the beam 3 at the passenger side is 35 mm with a thickness of 1.5 mm. The term thickness is intended to be understood as the thickness of the material which forms the tube.

In order to fix the ends 5, 6 of such a beam 3 to the vertical pillars, it is known to mount a fixing clamp 7 at each of the ends 5, 6, a width of which allows the desired inter-wheel spacing E to be obtained. The term inter-wheel spacing is intended to refer to the dimension which extends between the two fixings which are located on a clamp 7.

However, the addition of such reinforcement and fixing components tends to significantly increase the overall mass of the reinforcement structure. Furthermore, the mounting of the clamps 7 on the ends 5, 6 of the beam 3 is a long operation and requires great precision.

The other known solution is to integrate the function for fixing the beam directly in the beam, by crushing the ends 5, 6 in order to form a flattened portion 10 (FIG. 3A) on which the fixing zones 11, 12 are provided.

One of the disadvantages of such a solution is that this flattened portion 10 causes all the strength characteristics of the beam 3 to be lost in the region of the flattened ends 5, 6 thereof. As can be seen in FIG. 3B, the cross-section of the flattened portion 10 has no volume, so that the inertia at the location of the flattened portion is very low whilst the beam 3 is subjected to a very high level of stress in the region of the flattened fitting end. Anything gained by integrating the fixing function is therefore lost in terms of strength. It is known to add additional reinforcement components along the beam in order to provide it with the necessary strength for its function, which has a detrimental effect in terms of the mass.

Furthermore, owing to the small amount of space available in the cockpit, the beam must have a diameter and a thickness which are as small as possible, in particular at the passenger side, where the levels of stress are lower. Therefore, very often, the crushing 10 of the ends 5, 6 of the beam 3 does not allow adequate inter-wheel spacing E in the region of the crushed ends for good-quality fixing.

An object of the invention is to provide a beam for a dashboard whose ends integrate the fixing function and do not have the disadvantages described above.

To this end, in the invention, it is proposed to use an integral tube which has different diameters successively along the longitudinal axis of the tube. More precisely, at least the end of the beam which is intended to be at the passenger side in the motor vehicle, and advantageously the two ends of the tube, has a widened diameter compared with the remainder of the tube. In this manner, the diameter of the tube between the two ends is as small as possible in order to reduce the spatial requirement of the tube in the cockpit of the motor vehicle. In the region of the ends, however, the diameter of the tube is sufficiently large to allow partial crushing which allows fixing to pillars whilst maintaining sufficient strength to absorb the vibrations and other forces which may travel via the beam. The crushing is only partial so that the cross-section of the end in question has a volume and strength characteristics which are sufficient to prevent the use of reinforcement components along the beam. For example, only a semi-circle of the end of the tube is crushed, in the direction of the second semi-circle. The cross-section of the end is therefore of hat-like form, the rounded portion being surrounded by two flanks which extend in continuation of each other and in continuation of the diameter of the rounded portion which closes the cross-section. The solution according to the invention allows a gain in terms of mass since only the ends have an increased diameter (and optionally greater thickness) and no reinforcement component is necessary. Furthermore, the number of assembly steps is greatly reduced since the tube is integral, that is to say, formed in one piece, and neither a fixing clamp nor reinforcement components are used. The solution according to the invention further allows the comfort to be improved for the users of the motor vehicle by reducing vibrations. Furthermore, the beam according to the invention has very satisfactory behaviour during crash tests.

The invention therefore relates to a dashboard beam which is tubular, which has a circular cross-section and which is intended to extend transversely between vertical pillars of a motor vehicle, the beam being formed in one piece and having at least two different diameters between the two ends thereof, a larger diameter of the beam being in the region of an end of the beam which is intended to be located in the region of a driver's seat of the motor vehicle, characterised in that at least the end of the beam which is intended to be located in the region of a driver's seat and to be fixed to a vertical pillar of the motor vehicle is partially crushed so as to have a cross-section in the form of a circular arc whose chord which closes the cross-section extends at one side and the other of the circular arc, providing a planar face whose lateral edges surround the curved face of the circular arc.

The term "in one piece" is intended to refer to the fact that the beam is formed by a single component which has different diameters over the length thereof.

Preferably, the end of the beam which is intended to be located in the region of the passenger seat of the motor vehicle has a diameter which is equal to the diameter of the end of the beam at the side of the driver's seat.

Advantageously, the end of the beam at the side of the passenger seat is crushed in a similar manner to the end at the side of the driver's seat.

The lateral edges of the planar face of at least one partially crushed end of the beam each comprise a fixing zone in order to fixedly join the partially crushed end to a vertical pillar of the motor vehicle at two fixing locations which are arranged at one side and the other of the longitudinal axis of the beam. Of course, it is possible to provide a single fixing zone at the partially crushed end, for example, located in the axis of the beam.

Advantageously, the largest diameter of the beam is between 75 mm and 125 mm so as to obtain an inter-wheel spacing at least in the region of one end of the partially crushed beam of between 75 mm and 150 mm.

Advantageously, the beam has at least two different thicknesses between the two ends thereof, the greatest thickness preferably being in the region of the ends of the beam.

Advantageously, the or each end of the partially crushed beam is half-flattened in the direction of the other half which retains a semi-circular form.

The invention also relates to a structural unit which is intended to be arranged at the rear of a motor vehicle dashboard, the structural unit comprising at least one beam according to the invention.

The invention will be better understood from a reading of the following description and examination of the appended drawings, which are provided by way of non-limiting example of the invention and in which.

Figure 1:
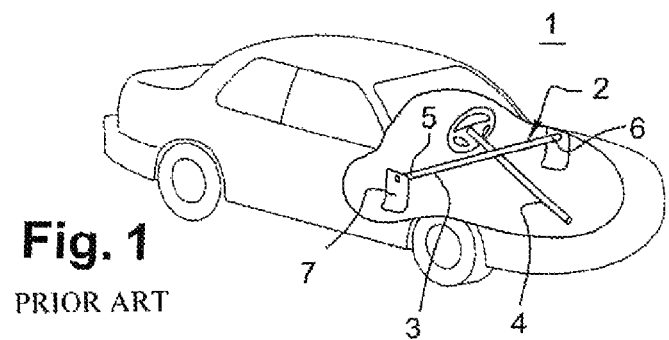
FIG. 1 is a schematic illustration of a motor vehicle in the region of which there is illustrated a transverse dashboard beam according to an embodiment of the prior art already described.
Figure 2:
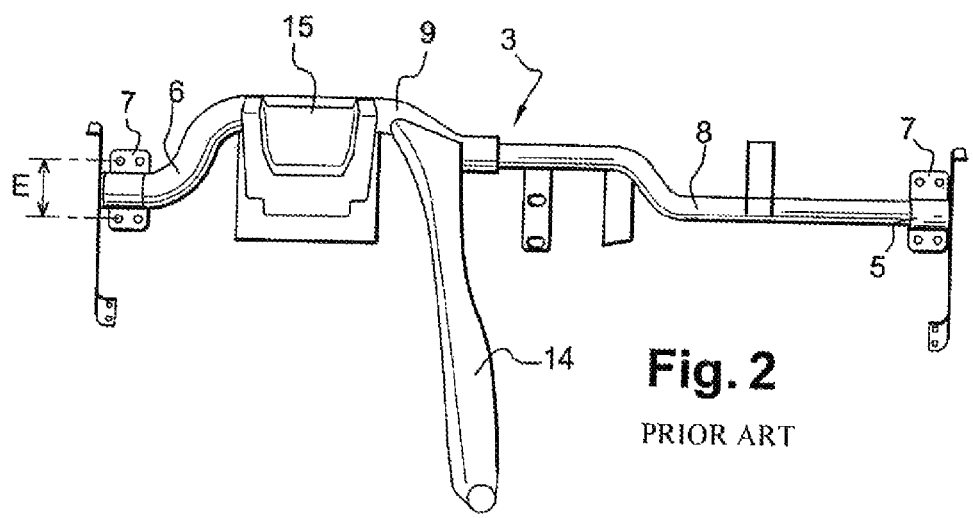
FIG. 2 is a schematic illustration of a structural unit of the prior art already described and provided with a transverse beam which is fixed by means of lateral clamps.
Figure 3A:
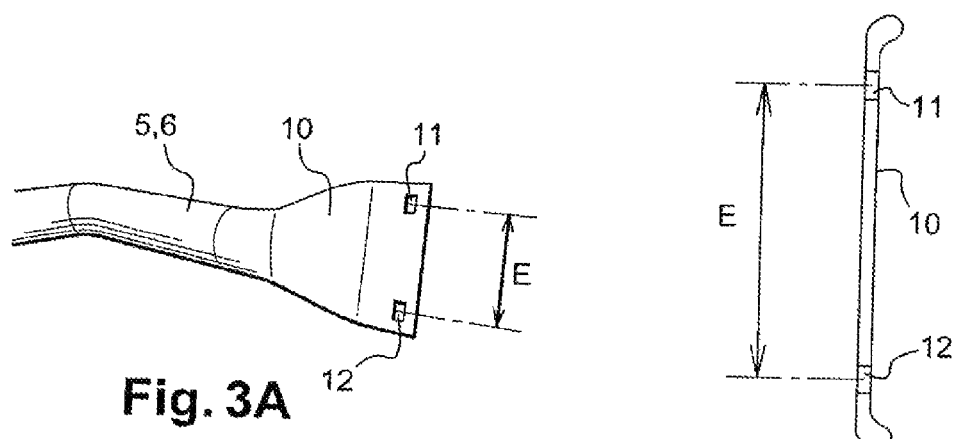
FIGS. 3A and 3B are an enlarged front view and cross-section of a flattened end of a transverse beam which integrates the fixing function according to another embodiment of the prior art already described, respectively.
Figure 3B:
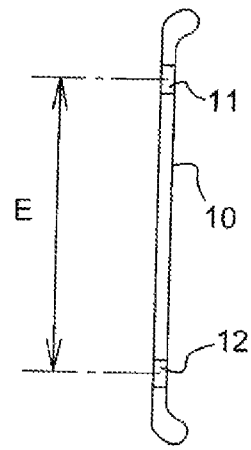
Figure 4:
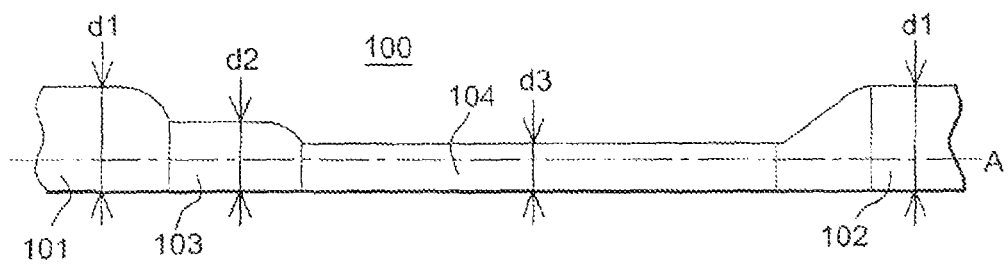
FIG. 4 is a schematic illustration of a tube which can be used to produce the dashboard beam according to the invention.

FIG. 4 illustrates an integral longitudinal tube 100 which has three diameters d1, d2 and d3 which are different along the longitudinal axis A. More precisely, the two ends 101, 102 of the tube 100 have a larger diameter d1, a portion 103 of the tube extending in continuation of one of the two ends 101, 102 which have an intermediate diameter d2 and another portion 104 of the tube which extends between the portion 103 having an intermediate diameter d2 and the other end 102 having a larger diameter d1 and which has a smaller diameter d3.

Such a tube 100 can advantageously be used to form a dashboard beam since the spatial requirement thereof between the two ends 101, 102 is reduced, only the ends having a widened diameter d1. Furthermore, such a tube 100 may also provide for variations of thickness. Advantageously, the thickness of the material forming the tube 100 is greater in the region of the ends 101, 102 than over the remainder of the tube 100. The inertia of the tube 100 varies in parallel with the variations of diameter and/or thickness, the greater values being obtained in the region of the ends 101, 102.

In the invention, it is proposed to use such a tube 100 as a dashboard beam.

Figure 5:
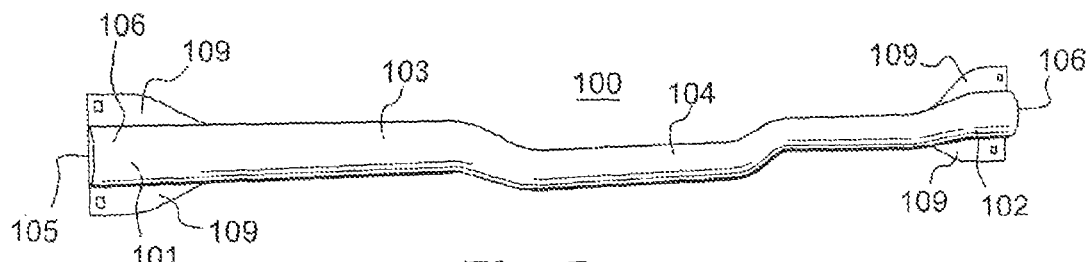
FIG. 5 is an illustration of a dashboard beam according to the invention.

According to the invention, the ends 101, 102 are partially flattened (FIGS. 5 and 6) so as to form fixing ends. That is to say, the partially flattened form of the ends 101, 102 allows the fixing function to be integrated directly in the ends 101, 102 so that it is not necessary to use intermediate elements, such as clamps, to fixedly join the ends 101, 102 to vertical pillars of the motor vehicle.

Figure 6:
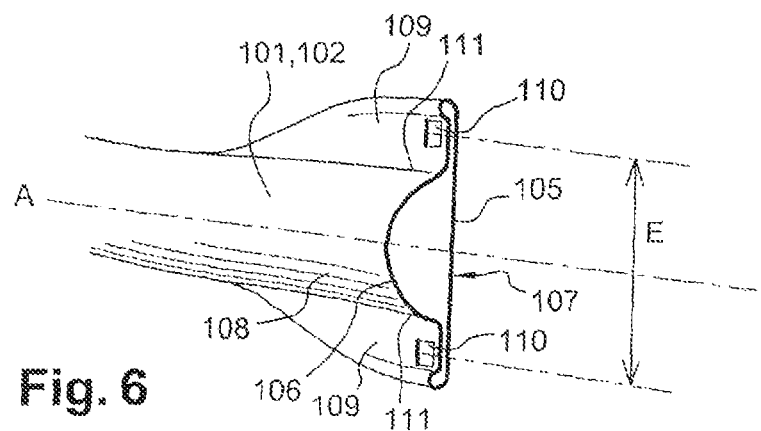
FIG. 6 is an enlargement of the beam of FIG. 5 in the region of a fixing end.

As can be seen in FIG. 6, the ends 101, 102 have a cross-section in the form of a circular arc which is closed by the chord 105 of the circular arc 106. The end 101, 102 of the cylindrical circular tube 100 is half-flattened in the direction of the other half which retains its semi-circular shape. In this manner, a face 107 of the end 101, 102 which is intended to be attached to the motor vehicle structure is planar, whilst the opposite face 106 is rounded. The planar face 107 of the end 101, 102 protrudes at one side and the other of the rounded face 108, providing two lateral fixing flaps 109 which extend at one side and the other of the longitudinal axis of the tube 100. The planar face 107 extends in the diameter of the rounded face 108 via the flaps 109. The flaps 109 are formed by the crushed material of a half-perimeter of the end 101, 102 in question and have a thickness which is equal to double the thickness of the material which forms the tube 100 at the location of the end 101, 102.

Advantageously, a fixing hole 110 is provided in each of the flaps 109 so as to be able to fix, for example, using fixing screws, the end 101, 102 in question to the motor vehicle structure at two locations.

In accordance with the desired inter-wheel spacing E, the fixing holes 110 are moved closer to or away from the edges 111 of the rounded face 108.

In this manner, for example, for a tube 100 having the following dimensions:

d1=80 mm d2=55 mm and thickness of the zone=1.5 mm d3=40 mm and thickness of the zone=1.2 mm It is possible to obtain a fixing end which is partially flattened and which has an inter-wheel spacing E=90 mm.

In order to obtain the ends 101, 102 in a partially flattened manner, it is possible in particular to crimp them before, at the same time as, or after the bending of the central portion 103, 104.

The invention claimed is:

1. A tubular dashboard beam:

the beam having a circular cross-section, the beam configured to extend transversely between vertical pillars of a motor vehicle, the beam having i) a first end configured to be located in a region of a driver's seat of the motor vehicle and to be fixed to a vertical pillar of the motor vehicle, and ii) a second end configured to be located in the region of the passenger seat of the motor vehicle has a diameter which is equal to the diameter of the first end, the beam being formed in one piece and having at least two different diameters between the first and second ends, a largest diameter of the beam being in the region of the first end of the beam, the second end of the beam having a diameter which is equal to a largest diameter of the first end of the beam, wherein at least the first end of the beam is partially crushed so as to have a cross-section in the form of a circular arc whose chord which closes the cross-section extends at one side and the other of the circular arc, providing a planar face whose lateral edges surround a curved face of the circular arc.

2. A beam according to claim 1, wherein lateral edges of the planar face of at least one partially crushed end of the beam each comprise a fixing zone in order to fixedly join the partially crushed end to a vertical pillar of the motor vehicle at two fixing locations which are arranged at one side and the other of the longitudinal axis of the beam.

3. A beam according to claim 1, wherein the largest diameter of the beam is between 75 mm and 125 mm so as to obtain an inter-wheel spacing at least in the region of one end of the partially crushed beam of between 75 mm and 150 mm.

4. A beam according to claim 1, wherein the beam has two different thicknesses between the first and second ends.

5. A beam according to claim 1, wherein each end of the partially crushed beam is half-flattened in the direction of the other half which retains a semi-circular form.

6. A beam according to claim 1, wherein the lateral edges of the planar face of at least one partially crushed end of the beam each comprise a fixing zone in order to fixedly join the partially crushed end to a vertical pillar of the motor vehicle at two fixing locations which are arranged at one side and the other of the longitudinal axis of the beam.

7. A beam according to claim 2, wherein the largest diameter of the beam is between 75 mm and 125 mm so as to obtain an inter-wheel spacing at least in the region of one end of the partially crushed beam of between 75 mm and 150 mm.

8. A beam according to claim 2, wherein the beam has two different thicknesses between the first and second ends.

9. A beam according to claim 3, wherein the beam has two different thicknesses between the first and second ends.

10. A beam according to claim 2, wherein each end of the partially crushed beam is half-flattened in the direction of the other half which retains a semi-circular form.

11. A beam according to claim 3, wherein each end of the partially crushed beam is half-flattened in the direction of the other half which retains a semi-circular form.

12. A beam according to claim 4, wherein each end of the partially crushed beam is half-flattened in the direction of the other half which retains a semi-circular form.

13. A tubular dashboard beam, comprising:
an integral longitudinal tube having a longitudinal axis, a circular cross-section, a first end and a second end,
the tube configured to extend transversely between vertical pillars of a motor vehicle,
along the longitudinal axis A, the tube having a first diameter, a second diameter, and a third diameter, the first diameter being greater than the second diameter, the second diameter being greater than third diameter, the first diameter being the largest diameter of the tube,
the first and second ends of the tube each having the first diameter,
a first portion of the tube extending in continuation the first end having the second diameter,
a second portion of the tube extending between the first portion and the second end having the third diameter,
wherein, the first and second ends are partially flattened and define fixing ends configured for directly fixing to the vertical pillars of the motor vehicle,
the first and second ends have a cross-section of a circular arc closed by a first chord of the circular arc, the first chord extending between sides of the circular arc and defining a planar face with lateral edges surrounding a curved face of the circular arc.

14. The tubular dashboard beam of claim 13, wherein,
a thickness of the tube is greater in a region of the first and second ends than another thickness of the tube in the first and second portions.

15. The tubular dashboard beam of claim 13, wherein,
the cross-section of the circular arc closed by the first chord defines a semi-circular shape,
the planar face protrudes from each end of the circular arc and provides two lateral fixing flaps which extend on each side of the longitudinal axis of the tube.

16. The tubular dashboard beam of claim 15, wherein,
the fixing flaps have a thickness equal to double a thickness of circular arc.

17. The tubular dashboard beam of claim 16, wherein,
each fixing flap comprises a fixing hole configured to fix the first and second ends to the vertical pillars of the motor vehicle.

18. The tubular dashboard beam of claim 13, wherein,
the first diameter is 80 mm,
the second diameter is 55 mm, and
the third diameter is 40 mm.

* * * * *